(12) United States Patent
Tsujimoto

(10) Patent No.: US 6,700,887 B1
(45) Date of Patent: Mar. 2, 2004

(54) PACKET TRANSFER APPARATUS WHICH GENERATES ACCESS REJECT COMMAND DURING A DMA TRANSFER

(75) Inventor: Hiroyuki Tsujimoto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/496,185

(22) Filed: Feb. 2, 2000

(30) Foreign Application Priority Data

Feb. 3, 1999 (JP) .......................................... 11-026060

(51) Int. Cl.$^7$ ............................................. H04L 12/56
(52) U.S. Cl. ........................ 370/389; 370/471; 370/474
(58) Field of Search ............................. 370/395.1, 471, 370/474, 363, 378, 379, 381, 389

(56) References Cited

U.S. PATENT DOCUMENTS

| | | | |
|---|---|---|---|
| 5,598,406 A | * | 1/1997 | Albrecht et al. ............. 370/296 |
| 5,805,927 A | * | 9/1998 | Bowes et al. |
| 5,920,564 A | * | 7/1999 | Leichty et al. ............... 370/395 |
| 6,105,160 A | * | 8/2000 | Fukumoto et al. ........... 714/776 |

* cited by examiner

Primary Examiner—Kenneth Vanderpuye
(74) Attorney, Agent, or Firm—Arent Fox Kintner Plotkin & Kahn, PLLC

(57) ABSTRACT

A packet transfer apparatus for transferring data packets between devices connected to a bus includes a receiving circuit connected to the bus for receiving a packet from the bus and a transmit circuit, also connected to the bus, for forming and placing a transmit packet on the bus. A header identification circuit, connected to the receiving circuit, detects a packet header of the received packet and determines if the packet header indicates a DMA transfer operation. A first buffer is provided for storing the packet data when the packet header indicates a DMA transfer and a second buffer is provided for storing the packet data when the packet header does not indicate a DMA transfer. A memory is connected to the first buffer and stores the packet data it receives from the first buffer. The memory also transfers stored data to the first buffer. A DMA controller is provided to control a DMA operation between the memory and the first buffer. A processor handles non-DMA operations and is free to perform such operations while a DMA operation is being performed. That is, when a DMA operation is being carried out by the memory and the first buffer, the processor is able to respond to a request from an external device using the transmit circuit.

20 Claims, 2 Drawing Sheets

PACKET TRANSFER APPARATUS WHICH GENERATES ACCESS REJECT COMMAND DURING A DMA TRANSFER

BACKGROUND OF THE INVENTION

The present invention relates to a packet transfer control apparatus, and more particularly, to a packet transfer control apparatus which employs a direct memory access (DMA) transfer.

In order to rapidly transfer quantities of data, an interface unit as a transfer controller according to the IEEE 1394 standard is employed. The interface unit is controlled by a microprocessor unit (MPU). In the packet transfer technique defined in the IEEE 1394 standard, a packet including data and header information is transferred. The MPU receives the packet and decodes the header information included in the packet to determine how the data that follows the header information is to be processed. The IEEE protocol defines the amount of data which can be stored in one packet. Using this transfer technique, data having an increased amount of information, such as image information, cannot be stored in one packet. Therefore, the data must be divided into a plurality of blocks. Thus, a packet including header information is formed for each data block, and a plurality of packets are transferred in succession to achieve a transfer of a large quantity of data. The MPU receives and stores the divided data in a memory in sequential order so that it can recover the original data. Such packets are often used in the display of a picture such as a moving picture and thus are transmitted in succession in a short time, increasing the load on the MPU.

A direct memory access (DMA) transfer technique transfers quantities of data and allows data from an external unit to be downloaded into the memory without using the MPU.

Specifically, referring to FIG. 1, a packet transfer control apparatus (or node) 30 employing the DMA transfer technique comprises an interface 31, a buffer 32, an MPU 33, a DMA controller 34 and a memory 35. The interface 31 receives a packet including a header and data from a network, provides the header which is extracted from the packet to the MPU 33, and provides the data to the buffer 32. When the MPU 33 determines on the basis of header information that the received data is for the DMA transfer, the MPU 33 provides an enable signal to the DMA controller 34, which then initiates a data transfer between the buffer 32 and the memory 35.

The buffer 32 receives the DMA transfer data, transferred in succession, from the network. The DMA transfer data is then stored in the memory 35 under the control of the DMA controller 34. Thus, once the MPU 33 detects the DMA transfer addressed to its own node, the transfer between the buffer 32 and the memory 35 is controlled by the DMA controller 34, thus freeing the MPU 33 from the control of the data transfer.

Since the load on the MPU 33 is reduced by the use of the DMA transfer technique, the MPU 33 can perform other operations, such as data processing operations. In other words, the data input/output control between the buffer 32 and the memory 35 is occupied by the DMA controller 34 alone, and during such an interval, the MPU 33 is inhibited from performing such data transfer control.

Since interfacing by the MPU 33 is inhibited during the DMA transfer, the MPU 33 cannot accept a packet for an access demand from a node 41 when a node 40 is transferring packets to the node 30, as shown in FIG. 2. Accordingly, the node 30 cannot reply to the access demand. In this case, the node 41 retries the access demand until it receives a reply from the node 30. Thus, in the above described transfer technique, the operational efficiency of the remaining units connected to the network is lowered.

The lowering of the operational efficiency of the node 41 can be prevented if an "access rejected" reply is issued in response to the access demand, and the node 41 aborts the access demand and performs different operations. However, since no reply to the access demand is returned, the node 41 temporarily suspends operations. Alternatively, the node 41 only can perform a restricted operation.

SUMMARY OF THE INVENTION

It is an object of the invention to provide a packet transfer control apparatus which allows a processor to perform operations while a DMA operation is being performed.

In one aspect of the present invention, a packet transfer control apparatus for transferring a packet in the form of one of consecutive packets including blocks of data and a non-consecutive packet is provided. The apparatus includes a first buffer circuit for storing blocks of data included in the consecutive transfer packets. A memory unit is connected to the first buffer circuit and stores the blocks of data provided from the first buffer circuit. A direct memory access control unit is connected to the first buffer circuit and the memory unit and controls a direct transfer of the blocks of data between the first buffer circuit and the memory unit. A packet identification unit receives the packet and determining whether the packet is one of the consecutive packets and the non-consecutive packet and provides the consecutive packets to the first buffer circuit. A transmitting unit generates and transmits a response packet corresponding to the non-consecutive packet. The transmitting unit generates and transmits the response packet while the first buffer circuit and the memory unit perform the direct transfer operation.

In another aspect of the present invention, a method of transferring a packet in the form of a first packet including direct memory access data and a second packet including command data is provided. First, the first and second packets are received. Then, the direct memory access data included in the first packet is stored in a buffer circuit. The direct memory access data stored in the buffer circuit is transferred to a memory unit. The command data included in the second packet is processed simultaneously with the transfer step.

In yet another aspect of the present invention, a packet transfer apparatus connected to a bus is provided. The apparatus includes a receiving circuit connected to the bus for receiving a packet from the bus, the received packet including a header and data. A header identification circuit detects the received packet header and determining if the packet header indicates a DMA transfer. A first buffer stores the packet data when the packet header indicates a DMA transfer, as determined by the header identification circuit. A second buffer stores the packet data when the packet header does not indicate a DMA transfer, as determined by the header identification circuit. A memory stores the packet data received from the first buffer and for transferring stored data to the first buffer. A DMA controller controls a DMA operation between the first buffer and the memory and generates an interrupt signal indicating the DMA operation has been completed. A processor controls and performs non-DMA operations. A first transmit circuit forms and places a first transmit packet on the bus. When a DMA operation is being carried out by the memory and the first buffer, the processor is able to respond to a request from an external device using the first transmit circuit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAIL DESCRIPTION OF THE PREFERRED EMBODIMENTS

Figure 1:
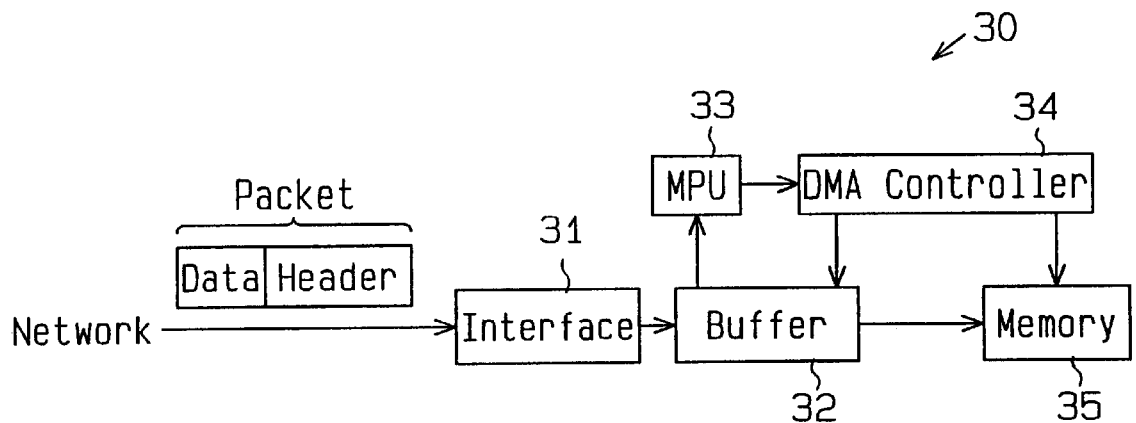
FIG. 1 is a schematic block diagram of a conventional packet transfer control apparatus.
Figure 2:
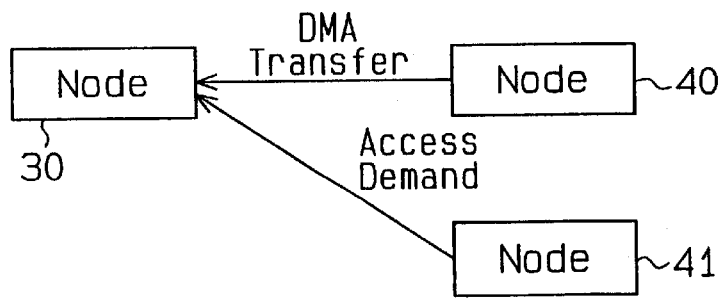
FIG. 2 is a schematic block diagram of the packet transfer control apparatus (node) of FIG. 1 and nodes connected thereto.
Figure 3:
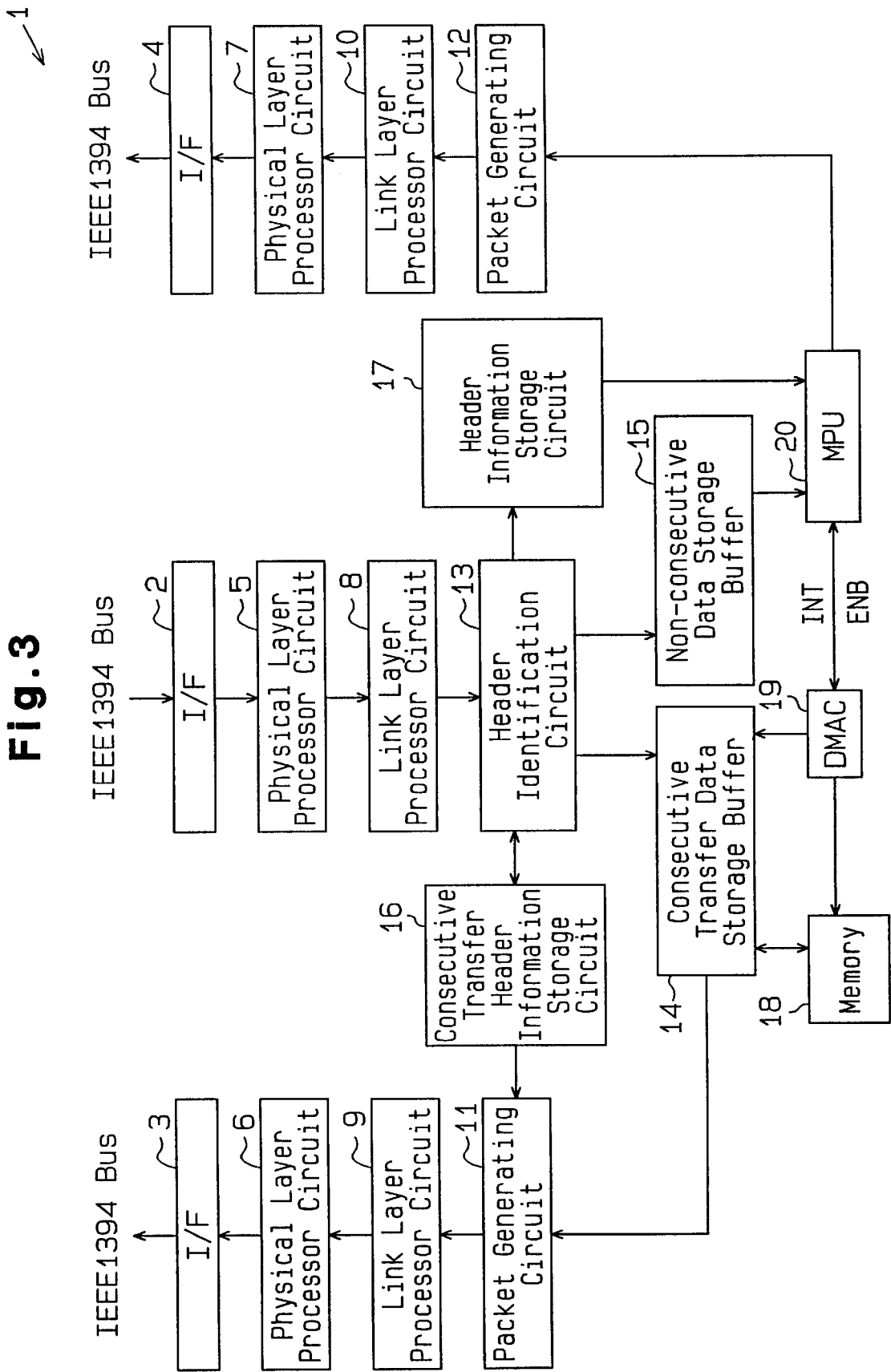
FIG. 3 is a schematic block diagram of a packet transfer control apparatus according to one embodiment of the present invention.

FIG. 3 is a block diagram of a packet transfer control apparatus 1 according to one embodiment of the present invention which is connected with an IEEE 1394 bus for use with a network.

The packet transfer control apparatus 1 comprises three interfaces (I/F's) 2, 3, 4, three physical layer processor circuits 5, 6, 7, three link layer processor circuits 8, 9, 10, two packet generating circuits 11, 12, a header identification circuit 13, two data storage buffers 14, 15, two header information storage circuits 16, 17, a memory 18, a DMA controller (DMAC) 19 and an MPU 20.

The packet transfer control apparatus 1 employs the DMA transfer technique to transfer data, such as image data, in successive packets, between the buffer 14 and the memory 18. Such data is divided into a plurality of blocks, and the blocks are stored as a plurality of packets which are then transferred as asynchronous packets in succession on the IEEE 1394 bus. Accordingly, the circuits other than the MPU 20 in the packet transfer control apparatus 1 perform a recognition between nodes, a negotiation which precedes a transfer of quantities of data, command decisions and status. However, it should be understood that such data may also be transferred as isochronous packets.

A packet includes header information and data. The header information includes:

1. a node ID (physical ID) to which the data is to be transferred;
2. a node ID (physical ID) from which data is to be transferred;
3. the type of packet (transaction code or TCODE), and if a series transfer is to be performed; and
4. the address of the transferred or stored data (or destination offset of a data storage region).

It should be understood however that packets other than those including data are transferred by the packet transfer control apparatus 1. Such packets may include commands such as a read request, a read-out response, a write request, and a write-in response. The MPU 20 receives any such packet from an external unit (not shown) and determines packet command.

In the description to follow, packets which are transferred in succession in accordance with the DMA transfer are referred to as consecutive transfer packets while remaining packets are referred to as non-consecutive packets.

The interfaces 2, 3 and 4 are connected to the IEEE 1394 bus to transfer packets to or from other units via the IEEE 1394 bus. The interface 2 serves as a receiving port which receives a packet, while the interfaces 3 and 4 serve as transmitting ports which transmit a packet therefrom.

The physical layer processor circuit 5 is connected to the interface 2 to receive a packet provided by the interface 2. The physical layer processor circuit 5 is connected to the link layer processor circuit 8 to provide the received packet thereto. At this time, the physical layer processor circuit 5 converts an electrical signal into a logical signal suitable for the link layer processor circuit 8.

The physical layer processor circuits 6, 7 are connected to the link layer processor circuits 9, 10, respectively, receive transmit packets from the link layer processor circuits 9, 10, respectively. The physical layer processor circuits 6, 7 are connected to the interfaces 3, 4, respectively, and provide the transmit packets thereto. The physical layer processor circuits 6, 7 convert logical received from the link layer processor circuits 9, 10, into corresponding electrical signals.

The link layer processor circuit 8 performs a format check of the received packet in order to assure a reliable packet transfer. Specifically, if the received packet is addressed to the link layer processor circuit 8, the circuit 8 provides the received packet to the header identification circuit 13, and if the received packet is addressed to other than the circuit 8, the circuit 8 provides the received packet to the other external unit via the physical layer processor unit 6 or 7 and the interface 3 or 4.

The packet generating circuits 11, 12 are connected to the link layer processor circuits 9, 10, respectively, and provide transmit packets generated by the circuits 11, 12 to the link layer processor circuits 9, 10. In other words, each of the packet generating circuits 11, 12 adds to input data from either the data storage buffer 14 or the MPU 20 header information adapted to the packet to be transmitted.

The header identification circuit 13 is connected to the link layer processor circuit 8 to receive the received packet from the link layer processor circuit 8. The header identification circuit 13 is connected to the consecutive transfer data storage buffer 14 and the consecutive transfer header information storage circuit 16 for handling the DMA transfer or consecutive transfer. Finally, the header identification circuit 13 is connected to the non-consecutive data storage buffer 15 and the header information storage circuit 17 for handling packet transfers other than the DMA transfer or for handling non-consecutive transfers.

The header identification circuit 13 identifies the received packet provided from the link layer processor circuit 8 on the basis of the header information included in the received packet. More specifically, the header identification circuit 13 determines whether the received packet is a consecutive transfer packet on the basis of the packet type which is indicated by the header information or TCODE. In accordance with a determination result, the header identification circuit 13 provides the header information included in the consecutive transfer packet to the header information storage circuit 16 while providing data included in the packet to the buffer 14. On the other hand, if the received packet is a non-consecutive transfer packet, the header identification circuit 13 provides the header information to the header information storage circuit 17 while providing the data included in the received packet to the non-consecutive data storage buffer 15.

When a packet including a command which indicates a DMA transfer is received and is identified by the header identification circuit 13, the header information of the received packet is stored in the consecutive transfer header information storage circuit 16. The header information includes an initial address of transfer data and a total length of the data transferred in succession.

The buffer 14 is connected to the memory 18 and the DMA controller (DMAC) 19. When the DMA transfer data is stored in the buffer 14, the DMA controller 19 initiates a transfer of the data from the buffer 14 to the memory 18. The other buffer 15 and the header information storage circuit 17 are connected to the MPU 20, which is in turn connected to the DMA controller 19 and the packet generating circuit 12.

The MPU 20 executes various processing operations in accordance with commands included in the header information stored in the header information storage circuit 17. Specifically, the MPU 20 processes data stored in the buffer 15 and provides data necessary to produce non-consecutive packets which are provided to the packet generating circuit 12. The MPU 20 provides an enable signal ENB which initiates the DMA transfer by the DMA controller 19. The control of the DMA controller 19 starts the data transfer between the buffer 14 and the memory 18 in response to the enable signal ENB. Upon completion of the DMA transfer, the DMA controller 19 provides an interrupt signal INT to the MPU 20, which then recognizes the completion of the DMA transfer.

The data storage buffer 14 is connected to the packet generating circuit 11 to provide data which is required for the transmission of the consecutive transfer packets thereto. It is to be noted that when the consecutive transfer packets are transmitted in succession, data stored in the memory 18 is transferred to the data storage buffer 14 on the basis of a control signal from the DMA controller 19. Upon completion of the consecutive transfer packets, the DMA controller 19 also provides an interrupt signal INT to the MPU 20, which then recognizes the completion of the DMA transfer.

In this manner, in the present embodiment, an interrupt from the DMA controller 19 to the MPU 20 is not issued during the transfer of the consecutive transfer packets.

When quantities of data are divided into a plurality of blocks for purpose of consecutive transfer, or when the consecutive transfer packets are transferred, there is a regularity to the packets. Therefore, it is easy to determine whether the packets are consecutive transfer packets. In the present embodiment, this decision is rendered on the basis of the TCODE included in the header information, but may be rendered on the basis of a node ID or the address where the transfer data is to be stored.

It is to be noted that quantities of data stored in the consecutive transfer packets are greater than the quantity of data stored in a non-consecutive packet. Accordingly, the buffer 14 preferably has a data storage capacity which is greater than that of the buffer 15.

It is to be understood that in the present embodiment, the combination of the header identification circuit 13 and the header information storage circuit 16 correspond to a packet identification unit, and the header information storage circuit 17 corresponds to a header storage unit. The combination of the MPU 20, the packet generating circuit 12, the link layer processor circuit 10, the physical layer processor circuit 7 and the interface 4 correspond to a transmitting unit; and the DMA controller 19 corresponds to a direct memory access control unit.

The operation of the packet transfer control apparatus 1 will now be described.

In the first instance, the reception of consecutive transfer packets in succession will be described.

Assume now that a packet including a command which indicates the DMA transfer is being transmitted from an external unit (not shown). The packet is provided via the interface 2, the physical layer processor circuit 5 and the link layer processor circuit 8 to the header identification circuit 13 where it is determined to be a packet including the command which indicates the DMA transfer, and the command is transferred to the header information storage circuit 17. At this time, the information included in the received packet, such as the initial storage address (the initial storage address or the offset address) or the total length of consecutive transfer data is stored in the header information storage circuit 16. The MPU 20 provides a DMA transfer enable signal to the DMA controller 19 on the basis of the command stored in the header information storage circuit 17, and also provides the initial storage address and the total data length to the DMA controller 19. This prepares the buffer 14 and the memory 18 to initiate a direct data transfer.

As the consecutive transfer packets including DMA transfer data are received, the header information of the received packets is identified by the header identification circuit 13 according to the variety of the packets (TCODE), and the data included in the packets are stored in the buffer 14. Subsequently, the data stored in the buffer 14 is transferred to the memory 18 under the control of the DMA controller 19.

As long as consecutive transfer packets including the DMA transfer data are received, the described operation is continued, thus storing data of the received packets into the memory 18 via the buffer 14. In this manner, data stored in the buffer 14 is sequentially transferred into the memory 18 under the control of the DMA controller 19 without any intervention required by the MPU 20.

Subsequently when a final packet of the DMA transfer data is stored in the memory 18, the DMA controller 19 determines the completion of the DMA transfer on the basis of the initial address and the total data length, and then provides the interrupt signal INT to the MPU 20, whereupon the DMA data transfer is completed.

Since the MPU 20 has no intervention with the DMA transfer as long as the consecutive transfer packets are being received in succession, the MPU 20 is free to execute other operations. In the present embodiment, the MPU 20 can execute a transfer of non-consecutive packets while the DMA transfer is being conducted because the data storage buffer 15 and the header information storage circuit 17 are available the non-consecutive transfer.

Now an instance will be described below in which an access request command is issued from an external unit to the apparatus 1 while the packet transfer control apparatus 1 is receiving the consecutive transfer packets.

When a packet including an access request which is intended for the purpose of DMA transfer is transmitted to the apparatus 1, the header identification circuit 13 compares the header information of the received packet with information stored in the consecutive transfer header information storage circuit 16, and determines that this packet is distinct from the consecutive transfer packets which are now subject to the DMA transfer. Accordingly, the header identification circuit 13 stores the header information of the received packet in the header information storage circuit 17. In response to the access request command included in the header information and stored in the header information storage circuit 17, the MPU 20 issues a response packet including an access rejected command. That is, the packet generating circuit 12 generates a packet which includes the access rejected command, and this packet is transferred via the link layer processor circuit 10, the physical layer processor circuit 7 and the interface 4 onto the IEEE 1394 bus.

When the response packet including the access rejected command is transferred from the apparatus 1 to the external unit which issued the access request, the external unit, upon receiving the access rejected command, ceases the DMA transfer to the apparatus 1, and executes another operation.

When a non-consecutive packet including data which is to be written into the apparatus 1 is received, the header identification circuit 13 provides the non-consecutive packet to the buffer 15, and the data of the received non-consecutive packet is subsequently processed by the MPU 20.

Since the MPU 20 is not required to control a DMA transfer in which the consecutive transfer packets are received in succession, the apparatus 1 can transmit a packet to an external unit which is other than the unit engaged in the DMA transfer. Thus, the MPU 20 causes the packet generating circuit 12 to generate a transmit packet, which may be transmitted via the link layer processor circuit 10, the physical layer processor circuit 7 and the interface 4 onto the IEEE 1394 bus.

An operation of the packet transfer control apparatus 1 to perform a consecutive transfer packet transmission in succession, will now be described.

Initially, the MPU 20 designates a region in the memory 18 (such as a start address for data and the data length) for the DMA transfer and supplies a read instruction to the DMA controller 19. The DMA controller 19 then causes data stored in the designated region of the memory 18 to be transferred to the buffer 14. When the data has been transferred to the buffer 14, it is then transmitted to the packet generating circuit 11 where an initial consecutive transfer packet is generated. This packet is transmitted via the link layer processor circuit 9, the physical layer processor circuit 6 and the interface 3 to the destination external unit. Subsequently, successive transmit packets are generated and transferred in succession until all of the data in the region of the memory 18 designated by the DMA controller 19 has been transferred. In this manner, a transmission of large quantities of data, such as image data, is conducted without any intervention of the MPU 20.

In the packet transfer control apparatus 1, the MPU 20 can execute another operation even when consecutive transfer packets are being transmitted in succession.

When the packets are being transferred in succession under the control of the DMA controller 19, a packet transfer to an external unit other than the unit which is the target of the consecutive DMA transfer can be performed. In this case, the MPU 20 causes the packet generating circuit 12 to generate a transmit packet, which is transferred via the link layer processor circuit 10, the physical layer processor circuit 7 and the interface 4 to the external unit.

In addition, when the consecutive transfer packets are being transmitted in succession, reception of a packet from an external unit, other than the unit which is the target of the DMA transfer, may be performed. In this case, header information included in the received packet is stored in the header information storage circuit 17, and a receiving processing operation is performed by the MPU 20. If the received packet includes data, such data is stored in the non-consecutive data storage buffer 15 and processed by the MPU 20.

In this manner, the DMA transfer data included in the consecutive transfer packets is efficiently transferred without any intervention of the MPU 20 while other transfer packets are received and processed by the MPU 20.

It will be apparent to those skill in the art that some of the circuits 2–12 may be combined into a single circuit. For instance, circuits 3, 4 and circuits 6, 7, respectively, may be combined. Similarly, circuits 9, 10 and circuits 11, 12, respectively, may be combined.

It will be noted that the present embodiment has the following effects;

(1) The reception of a separate packet is permitted when the consecutive transfer packets are being received in succession. Specifically, the packet transfer control apparatus 1 is able to issue a response to reject an access request from an external unit, other than a unit which is participating in the DMA transfer. In this manner, the external unit can receive a packet including an access rejected command, and therefore the external unit does not retry a transfer request with respect to the packet transfer control apparatus 1. This allows the operational efficiency of the overall system including the present apparatus 1 and other units connected to the apparatus 1 via the IEEE 1394 buses to be improved.

(2) When a packet indicating a DMA transfer is received, the MPU 20 provides an enable signal ENB to the DMA controller 19, thus allowing the DMA transfer to be initiated. On the basis of information stored in the header information storage circuit 16, the header identification circuit 13 determines whether the received packet represents one of a plurality of consecutive transfer packets including the DMA transfer data, and the DMA transfer data is stored in the data storage buffer 14 before it is transferred to the memory 18 by the DMA controller 19. When all of the DMA transfer data is stored in the memory 18, the DMA controller 19 provides an interrupt signal to the MPU 20, thus completing the DMA transfer. In this manner, the DMA transfer data transferred in succession is received and stored without the intervention of the MPU 20.

(3) The buffer 15 stores data other than the DMA transfer data, and is provided separate from the buffer 14. Data included in any received packet is distributed between the buffers 14 and 15 by the header identification circuit 13. Accordingly, the DMA transfer data is stored in the memory 18 via the buffer 14 without having any other, unrelated data, breaking it up. In addition, data other than the DMA transfer is processed at the same time as the DMA transfer is being performed.

(4) The buffer 14 preferably has a greater capacity than the buffer 15. In this manner, when the packet transfer control apparatus 1 is implemented in a semiconductor chip, a saving in the chip cost can be realized.

(5) When a non-consecutive packet including data other than the DMA transfer data is received, the header identification circuit 13 separates the non-consecutive packet into header information and data, the header information being stored in the header information storage circuit 17 and the data being stored in the data storage buffer 15. In other words, it is not required for the MPU 20 to separate the header information from the received packet, thus reducing the load on the MPU 20.

It should be apparent to those skilled in the art that the present invention may be embodied in many other specific forms without departing from the spirit or scope of the invention. Particularly, it should be understood that the invention may be embodied in the following forms:

(a) When consecutive transfer packets are being received in succession, it is unnecessary that the packets being received at this time be limited to those packets including the DMA transfer data. For example, such packet may include a command requiring the status of the DMA transfer to be returned or may include a command requiring that the DMA transfer be ceased. In such instance, the header identification circuit 13 detects the command, causing the packet generating circuit 11 to transmit a required transmit packet. In this manner, when receiving a packet including a command which requires returning the status of the DMA transfer or ceasing the DMA transfer, the MPU 20 can execute such other operations since it is not involved with the DMA transfer.

(b) The header information storage circuit 17 may be omitted. Specifically, header information may be stored in the buffer 15 and still processed by the MPU 20. In this instance, the buffer 15 includes to the header storage unit. In this case, it is still possible to receive a separate packet from another external unit, while consecutive transfer packets are being received in succession, thereby allowing the operational efficiency of the overall system including the apparatuses connected to the IEEE 1394 buses to be improved. However, it is required that the MPU 20 processes data after the header information is separated from the received packet.

(c) The buffer 15 may be omitted. In this case, if a non-consecutive packet is transferred to the apparatus 1 from an external unit while the apparatus 1 performing a DMA transfer, only the header information of the non-consecutive packet is stored in the header information storage circuit 17, and the MPU 20 issues a packet including an access rejected command. If a non-consecutive packet including data is received when a DMA transfer is not being conducted, such data is stored in the buffer 14, while storing its header information in the header information storage circuit 17. The MPU 20 processes the data stored in the buffer 14 in accordance with the header information stored in the header information storage circuit 17.

(d) The header identification circuit 13 or the header information storage circuit 16 may decode the command indicating the DMA transfer and issue the enable signal to the DMA controller 19. In this manner, there is no need for a processing operation to be performed by the MPU 20 at the commencement and at the completion of the DMA transfer, further reducing the load of the MPU 20.

(e) The present invention may be adapted to a packet transfer control apparatus connected to SCSI buses or a USB. That is, the present invention can be adapted to a packet transfer control apparatus which transfers packets including blocks generated by dividing quantities of data, such as image data.

(f) Instead of storing the header information including an initial transfer data address and a total length of data transferred in succession, the header information including a node ID of a mating unit, data length or address may be previously set in the header information storage circuit 16, if the header information is previously determined. That is, information such as a node ID of a mating node or the variety of packet associated with the DMA transfer may be stored in the header information storage circuit 16 to identify the DMA transfer data.

Therefore, the present examples and embodiments are to be considered as illustrative and not restrictive and the invention is not to be limited to the details given herein, but may be modified within the scope and equivalence of the appended claims.

What is claimed is:

1. A packet transfer control apparatus for transferring a packet in the form of one of consecutive packets including blocks of data and a non-consecutive packet, comprising:
    a first buffer circuit for storing blocks of data included in the consecutive transfer packets;
    a memory unit connected to the first buffer circuit, for storing the blocks of data provided from the first buffer circuit;
    a direct memory access control unit connected to the first buffer circuit and the memory unit, for controlling a direct transfer of the blocks of data between the first buffer circuit and the memory unit;
    a packet identification unit connected to the first buffer circuit for receiving the packet and determining whether the packet is one of the consecutive packets and the non-consecutive packet and providing the consecutive packets to the first buffer circuit; and
    a transmitting unit for generating and transmitting a response packet corresponding to the non-consecutive packet, wherein the transmitting unit generates and transmits the response packet while the first buffer circuit and the memory unit perform the direct transfer operation.

2. The apparatus of claim 1, wherein the packet includes header information, the apparatus further comprising a header storage unit for storing the header information, wherein the packet identification unit provides the header information included in the non-consecutive packet to the header storage unit and the transmitting unit generates and transmits the response packet based on the header information included in the non-consecutive packet.

3. The apparatus of claim 2 further comprising a second buffer circuit connected to the packet identification unit for storing data included in the non-consecutive packet.

4. The apparatus of claim 2, wherein the second buffer circuit has a smaller capacity than the first buffer circuit.

5. The apparatus of claim 2, wherein the header information includes information about a type of packet and the packet identification unit determines whether the packet is one of the consecutive packets or the non-consecutive packet on the basis of the variety of packet.

6. The apparatus of claim 2, wherein the header information includes node identification information and the packet identification unit determines whether the packet is one of the consecutive packets and the non-consecutive packet on the basis of the node identification information.

7. The apparatus of claim 1, further comprising a processor, wherein the packet includes a command which indicates a direct memory access transfer and the processor identifies the command and provides an enable signal to the direct memory access control, unit, and wherein the direct memory access control unit controls the direct transfer in response to the enable signal.

8. The apparatus of claim 7, wherein the direct memory access control unit generates and provides to the processor an interrupt signal upon completion of the direct transfer of the blocks of data.

9. A method of transferring packets including a first packet having direct memory access data and a second packet having command data, comprising the steps of:
    receiving the first packet or the second packet;
    determining whether the received packet is the first packet or the second packet;

storing the direct memory access data included in the first packet in a buffer circuit;

transferring the direct memory access data stored in the buffer circuit to a memory unit; and processing the command data included in the second packet simultaneously with the transfer of the direct memory access data.

10. The method of claim 9, wherein the command data processing step includes generating a response packet including an access rejected command.

11. The method of claim 9, wherein the second packet includes second header information, the method further comprising the step of storing the second header information in a header storage unit, and wherein the command data processing is performed in accordance with the second header information.

12. The method of claim 9, wherein the first packet includes first header information, the method further comprising the steps of:

receiving a third packet including third header information indicating initiation of a direct memory access transfer; and comparing the third header information and the first header information to determine whether the third packet includes direct memory access data.

13. The method of claim 12, wherein a response packet is generated when it is determined that the third packet does include the direct memory access data.

14. A packet transfer apparatus connected to a bus, comprising:

a receiving circuit connected to the bus for receiving a packet from the bus, the received packet including a header and data;

a header identification circuit, connected to the receiving circuit, for detecting the received packet header and determining if the packet header indicates a DMA transfer;

a first buffer, connected to the header identification circuit, for storing the packet data when the packet header indicates a DMA transfer, as determined by the header identification circuit;

a second buffer, connected to the header identification circuit, for storing the packet data when the packet header does not indicate a DMA transfer, as determined by the header identification circuit;

a memory connected to the first buffer for storing the packet data received from the first buffer and for transferring stored data to the first buffer;

a DMA controller, connected to the first buffer and the memory, for controlling a DMA operation between the first buffer and the memory and for generating an interrupt signal indicating the DMA operation has been completed;

a processor, connected to the second buffer, the header identification circuit and the DMA controller, for controlling and performing non-DMA operations; and a first transmit circuit, connected between the MPU and the bus, for forming and placing a first transmit packet on the bus, wherein when a DMA operation is being carried out by the memory and the first buffer, the processor is able to respond to a request from an external device using the first transmit circuit.

15. The packet transfer apparatus of claim 14, further comprising:

a second transmit circuit, connected between the first buffer and the bus, for forming and placing second transmit packets on the bus, the second transmits packet comprising the data read from the memory by way of the first buffer, as the result of the DMA operation.

16. The packet transfer apparatus of claim 15, further comprising:

a first header storage circuit, connected between the header identification circuit and the second transmit circuit, for storing the header of a DMA transfer packet.

17. The packet transfer apparatus of claim 16, further comprising:

a second header storage circuit, connected between the header identification circuit and the processor, for storing the header of a non-DMA transfer packet.

18. The packet transfer apparatus of claim 15, wherein the first buffer is larger than the second buffer.

19. The packet transfer apparatus of claim 15, wherein the receiving circuit comprises:

an interface circuit in communication with the bus for receiving the packet therefrom;

a physical layer processing circuit, connected to the interface circuit, for translating the packet, as received from the bus, to a logical signal; and a link layer processing circuit, connected between the physical layer processing circuit and the header identification circuit, for determining whether the packet was correctly transferred, checking an address of the packet, and passing the packet to the header identification circuit.

20. The packet transfer apparatus of claim 19, wherein the first and second transmit circuits each comprise:

an interface circuit in communication with the bus for placing the first or second transmit packet thereon;

a physical layer processing circuit, connected to the interface circuit, for translating the first or second transmit packet from a logical signal to a bus compatible electrical signal; and a link layer processing circuit connected to the packet generating circuit; and a packet generating circuit, connected between either the first buffer or the processor and the link layer processing circuit, for forming the first or second transmit packet, including a packet header and packet data, and passing the formed packet to the link layer processing circuit.

* * * * *